(12) United States Patent
Kreuzer et al.

(10) Patent No.: US 8,681,731 B2
(45) Date of Patent: Mar. 25, 2014

(54) ORTHOGONAL FREQUENCY-DIVISION MULTIPLEXING (OFDM) COMMUNICATION SLOT STRUCTURES AND METHODS

(75) Inventors: Werner Kreuzer, Baiern (DE); Michael Eoin Buckley, Grayslake, IL (US); Yan Xin, Kanata (CA); Shouxing Qu, Ottawa (CA); Sean Bartholomew Simmons, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 853 days.

(21) Appl. No.: 12/781,771

(22) Filed: May 17, 2010

(65) Prior Publication Data

US 2011/0280238 A1 Nov. 17, 2011

(51) Int. Cl.
*H04W 4/00* (2009.01)
(52) U.S. Cl.
USPC .......................................................... 370/330
(58) Field of Classification Search
USPC ......... 370/310, 347, 344, 321, 328, 330, 319, 370/338, 436, 312
See application file for complete search history.

(56) References Cited

U.S. PATENT DOCUMENTS

| | | | |
|---|---|---|---|
| 5,818,813 A | 10/1998 | Saito et al. | |
| 6,369,758 B1 * | 4/2002 | Zhang | 342/383 |
| 6,449,246 B1 * | 9/2002 | Barton et al. | 370/210 |
| 6,891,898 B2 * | 5/2005 | Peyla et al. | 375/267 |
| 7,379,417 B2 * | 5/2008 | Agrawalla et al. | 370/208 |
| 2008/0043866 A1 | 2/2008 | Mujtaba | |

FOREIGN PATENT DOCUMENTS

| | | |
|---|---|---|
| JP | 09-135230 | 5/1997 |
| JP | 11-145928 | 5/1999 |
| WO | 2008/014522 | 1/2008 |

OTHER PUBLICATIONS

Syed Aon Mujtaba and Jack Winters, Standardization of MIMO-OFDM Technology, Globecom 2007 Tutorial, available online at: http://www.jackwinters.com/Globecom07_tutorial.pdf, Nov. 26, 2007, 89 pages.
GP100364, Eircsson, "Precoded EGPRS2 Downlink," 3GPP TSG GERAN#45, Berlin, Mar. 2010, 24 pages.
3GPP, 3GPP TS 45.001 V9.2.0, 3rd Generation Partnership Project; Technical Specification Group GSM/EDGE Radio Access Network; Physical layer on the radio path; General description (Release 9), Mar. 2010, 43 pages.
3GPP, 3GPP TS 45.002 V9.3.0, 3rd Generation Partnership Project; Technical Specification Group GSM/EDGE Radio Access Network; Multiplexing and multiple access on the radio path (Release 9), Mar. 2010, 112 pages.

(Continued)

*Primary Examiner* — Anh Ngoc Nguyen
(74) *Attorney, Agent, or Firm* — Hanley, Flight & Zimmerman, LLC

(57) ABSTRACT

Improved orthogonal frequency-division multiplexing (OFDM) communication slot structures and method are described. One example method includes converting a first portion of a set of bits to a first orthogonal frequency-division multiplexing symbol to be transmitted during a first portion of a time-division multiple access time slot, and converting a second portion of the set of bits to a second orthogonal frequency-division multiplexing symbol to be transmitted during a second portion of the time-division multiple access time slot. Other embodiments are shown and described.

29 Claims, 12 Drawing Sheets

(56) References Cited

OTHER PUBLICATIONS

3GPP, 3GPP TS 45.003 V9.0.0, 3rd Generation Partnership Project; Technical Specification Group GSM/EDGE Radio Access Network; Channel coding (Release 9), Dec. 2009, 321 pages.

G100561, Eircsson, Telecom Italia, Vodafone, "New DRAFT WI proposal: Signal Precoding Enhancements for EGPRS2DL", 3GPP TSG-GERAN #45, Berlin, Mar. 2010, 6 pages.

Patent Cooperation Treaty, "Written Opinion", issued in connection with PCT application No. PCT/US2011/036655, mailed Oct. 14, 2011, (10 pages).

Patent Cooperation Treaty, "International Search Report", issued in connection with PCT application No. PCT/US2011/036655, mailed Oct. 14, 2011, (6 pages).

Japanese Patent Office, "Notice of Reasons for Rejection" and Translation, issued Oct. 11, 2013, in connection with Japanese Patent Application No. 2013-511262, (5 pages).

* cited by examiner

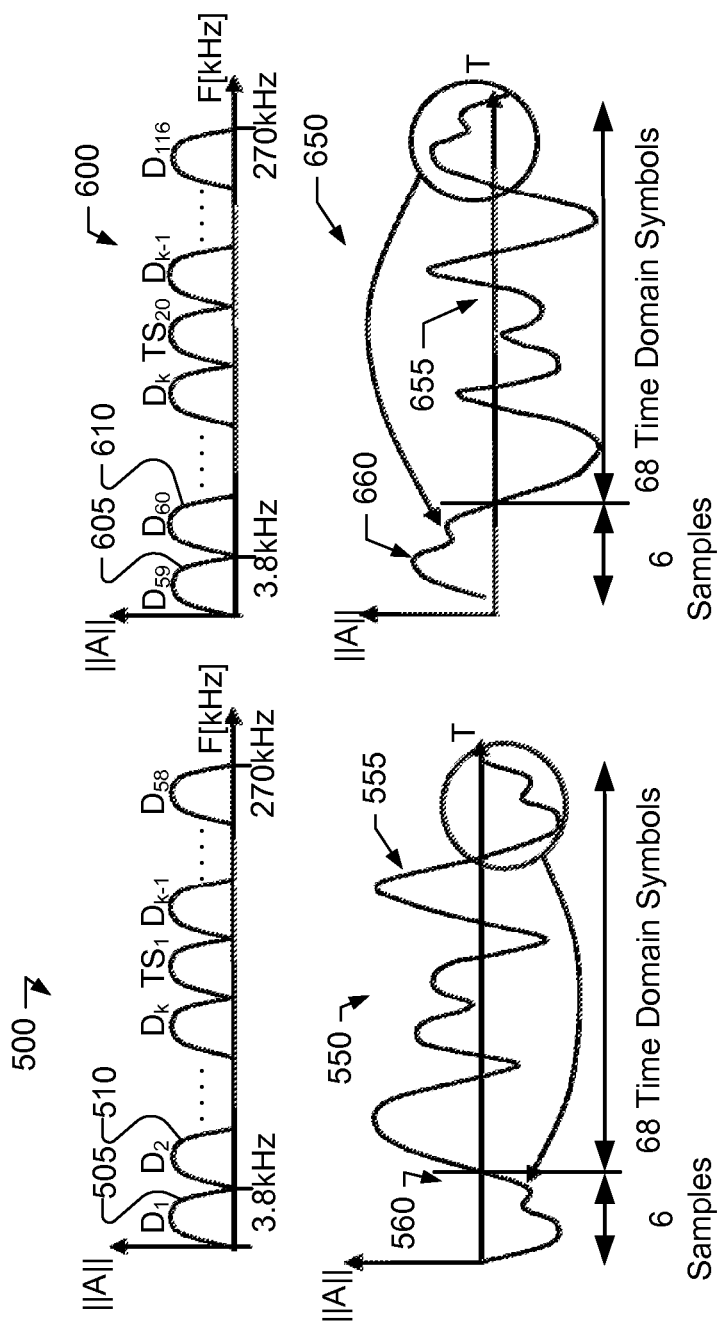

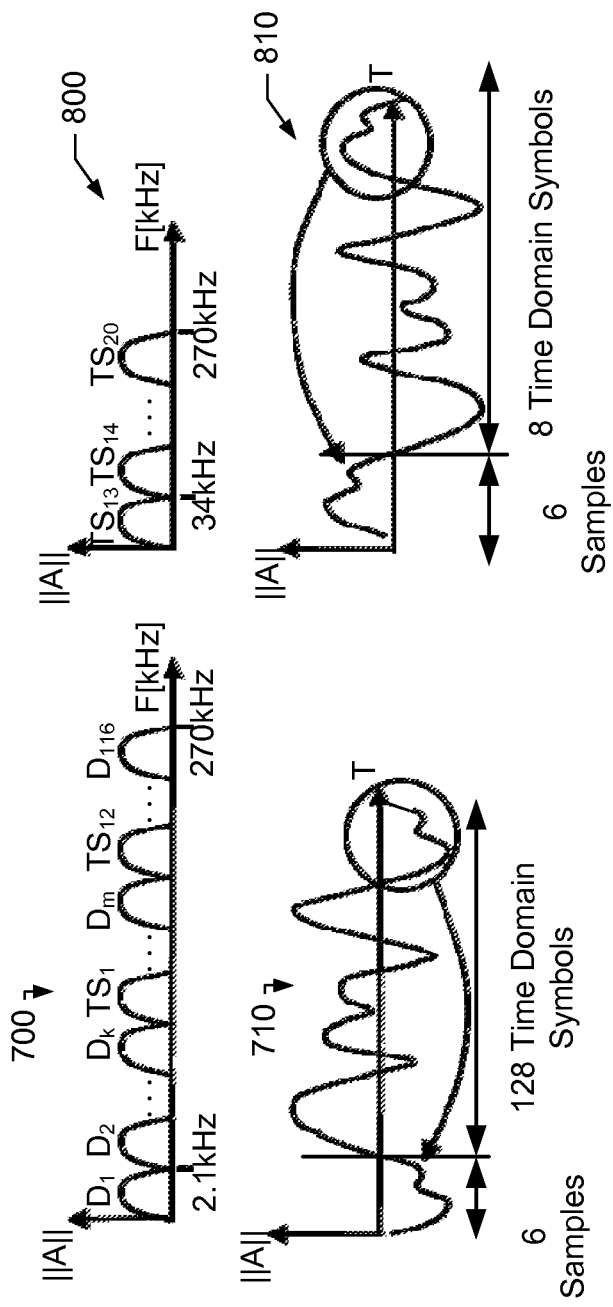

US 8,681,731 B2

ORTHOGONAL FREQUENCY-DIVISION MULTIPLEXING (OFDM) COMMUNICATION SLOT STRUCTURES AND METHODS

FIELD OF THE DISCLOSURE

This disclosure relates generally to mobile communications and, more particularly, to improved communication slot structures and methods.

BACKGROUND

Currently known or proposed techniques for allowing orthogonal frequency-division multiplexing (OFDM) using the numerology of the current Enhanced General Packet Radio Service (EGPRS) utilize a single OFDM symbol within a time slot. Additionally, currently known or proposed techniques require spectral shaping at the edges of the transmission band and include a training symbol distribution that is not optimal for channel estimation at the edges of the transmission band.

BRIEF DESCRIPTION OF THE DRAWINGS

FIGS. 5 and 6 illustrate example frequency and time domain signals produced by the signal generator of FIG. 4 to send information in two sub-slots.

FIGS. 7 and 8 illustrate example frequency and time domain signals produced by the signal generator of FIG. 4 to send information in two sub-slots using a radix 2 allocation of symbols in two sub-slots.

DETAILED DESCRIPTION

Figure 1:
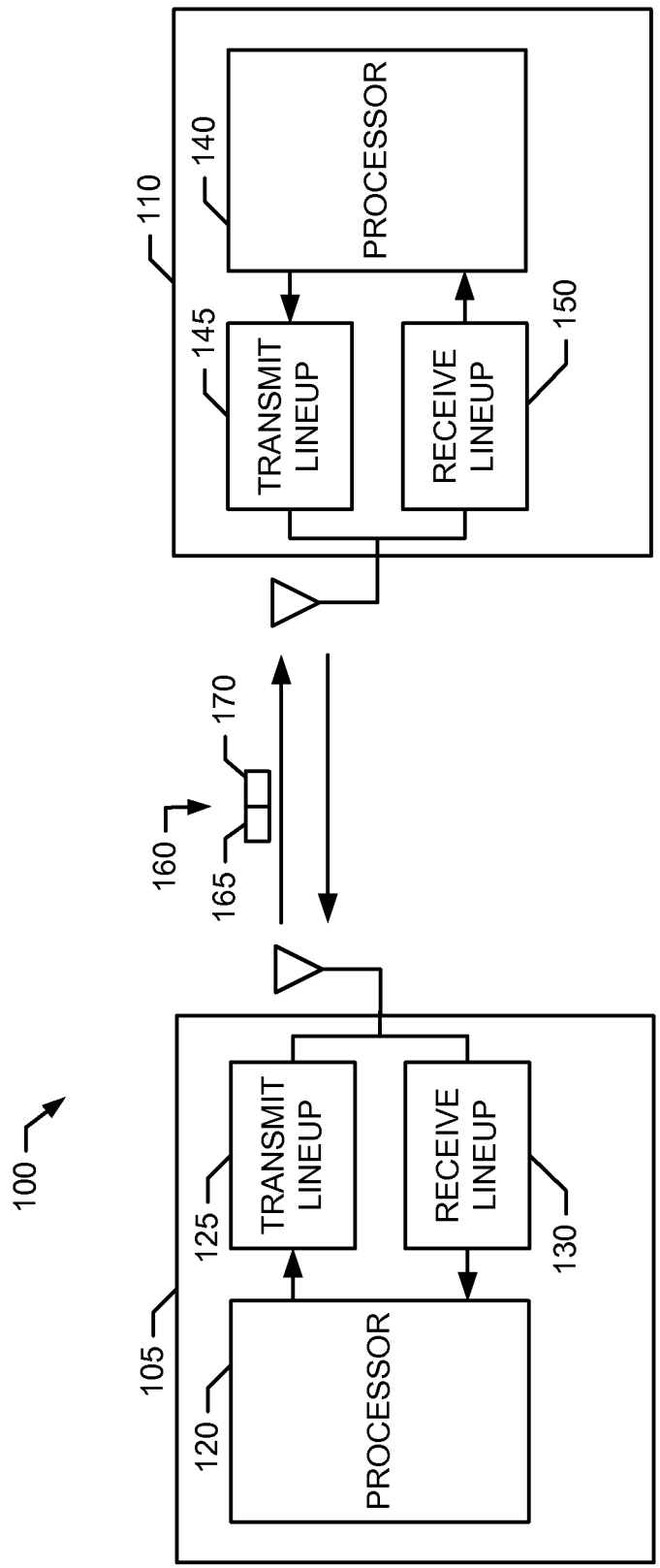
FIG. 1 is block diagram of an example mobile communication system including an example mobile station and an example network element implementing methods and apparatus to implement and utilize the improved communication slot structures and methods described herein.

Methods and apparatus to implement and utilize the improved communication slot structures described herein.

Although the following discloses example methods and apparatus including, among other components, software executed on hardware, it should be noted that such methods and apparatus are merely illustrative and should not be considered as limiting. For example, it is contemplated that any or all of these hardware and software components could be implemented exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

The example methods and apparatus to implement and utilize an improved communication slot structure include subdividing a time division multiple access (TDMA) communication time slot into two or more sub-slots each of which is occupied by a single OFDM symbol. In a conventional arrangement, to remain unchanged compared to the current art enabling OFDM based communication in EGPRS slot structure (GP100364, Ericsson, "Precoded EGPRS2 Downlink," GERAN#45, Berlin, which is incorporated herein by reference), all data to be communicated during a time slot is carried during that time slot using a defined set of sub-carriers on a single OFDM symbol. As described herein, data and/or training sequence symbols for transmission may be communicated in the sub-slots, each occupied by an OFDM symbol which may be of unequal size. Because each sub-slot is of smaller duration than the original time slot but is sampled at the same rate, the spacing between each sub-carrier in each OFDM symbol is wider. For example, the current art consists of occupying a conventional slot, such as a Global System for Mobile Communications (GSM) time slot with a single OFDM symbol consisting of a cyclic prefix of 6 samples and a body of 142 samples in a $15/26$ millisecond (ms) burst resulting in 142 sub-carriers transporting 116 data symbols and 26 training sequence symbols and where each sub-carrier is spaced apart by 1.9 kilohertz (kHz). This sub-carrier spacing is quite small and can result in degrading the signal to noise ratio experienced at each sub-carrier at high speeds.

In the arrangements described herein, the same number of data and/or training sequence symbols may be carried in two sub-slots the total time duration of which is $15/26$ ms, wherein each of the sub-slots includes carriers having wider bandwidth spacing than in a conventional frame. For example, if the symbols from a conventional slot are divided evenly into two sub-slots each containing an OFDM symbol with a cyclic prefix length of 6 samples and OFDM symbol body of 68 samples, the bandwidth of the sub-carriers in each sub-slot is twice as wide as those of the conventional slot (e.g., 3.8 kHz vs. 1.9 kHz). However, since 6 time domain samples are used for the cyclic prefix in the second OFDM symbol, the total number of sub-carriers carried by the two OFDM symbols has now been reduced from 142 to 136 (or 68×2). In this example, in order to transport the same 116 data symbols, the number of training sequence symbols is reduced from 26 to 20. In an alternative example, the number of data symbols is reduced to 110 data symbols and all 26 training sequence symbols are transported.

In an alternate example the cyclic prefix of the second OFDM symbol could be obtained, or borrowed, from the guard period between bursts. Also, the cyclic prefix need not be an integer number of samples.

One division of symbols between sub-slots is to divide the symbols such that the number of time domain symbols in the OFDM body in each sub-slot is a power of two (i.e., radix 2). The radix 2 division allows efficient time domain-to-frequency domain transformations (e.g., discrete Fourier transformation, fast Fourier transformation, etc.) at the receiver. Thus, a radix 2 number of symbols simplifies demodulation.

To comply with spectral emissions requirements of an EGPRS burst, amplitudes of sub-carriers at the edges of the frequency band carrying an EGPRS burst are attenuated when compared to the sub-carriers in the middle of the band. Uneven attenuation throughout the band carrying the EGPRS burst results in unequal error protection for information carried in the burst. Thus, there will be a lower signal to noise ratio or higher bit error rate (BER) at the frequency edges of the burst as compared to the center of the burst if the same modulation is used throughout. As described herein, different modulation schemes may be used between the center of the band and the edges of the band. For example, a modulation scheme such as binary phase shift keying (BPSK) or some other relatively low bits-per-symbol modulation scheme may be used at the edges of the band and a relatively high bits-per-symbol modulation scheme, such as 16-quadrature amplitude modulation (16-QAM) may be used in the relative middle of the band. In this manner, because the reduced density modulation schemes offer greater per bit protection for identical signal to noise ratios, the uneven per bit error protection due to uneven signal to noise ratio experienced by sub-carriers can be mitigated. As a result of selecting different modulation schemes based on sub-band position within the communication band, communication performance through an additive Gaussian white noise (AWGN) channel is improved.

As described herein, in some embodiments training sequence symbols (also called training symbols) can be located such that there are training symbols on either side of data symbols, when viewing the symbols in the frequency domain. This arrangement allows interpolation to be used to develop a channel estimate between training symbols and to apply that channel estimate to the data symbols located between the training symbols. As described above, it is also possible to use two or more sub-slots to transmit information. In accordance with the disclosure herein, it is possible to utilize training symbols at the ends of the bands in either of the sub-slots and to use those training symbols to assist in channel estimation of the a different sub-slot. For example, a training symbol may be located at the highest sub-carrier of a first sub-slot and another training symbol may be located at the lowest sub-carrier of a second sub-slot. The training symbol of the highest sub-carrier of the first sub-slot may be used in channel estimation performed when processing information in the second sub-slot because the sub-carriers of the two sub-slots are identical and the two sub-slots are located closely in time and, thus, the assumption may be made that the timing between the sub-slots is much smaller than timing with which the channel changes significantly. A training symbol may comprise one or more training bits.

Each of the foregoing techniques may be used independently, or certain ones of the techniques may be used together.

Turning to the figures, a block diagram of an example mobile communication system 100 supporting the example communication slot structures disclosed herein is illustrated in FIG. 1. The mobile communication system 100 corresponds to an (E)GPRS-based communication system, such as a GPRS system or an EGPRS system. GPRS is an abbreviation for general packet radio service, EGPRS is an abbreviation for enhanced GPRS, and (E)GPRS refers to an implementation compatible with a GPRS system or an EGPRS system. Although the disclosed communication slot structures are described in the context of the mobile communication system 100 being an (E)GPRS system, the disclosed communication slot structures can be readily adapted for use in many other communication systems and, thus, the disclosed communication slot structures are not limited to use in only (E)GPRS systems.

The mobile communication system 100 of FIG. 1 includes a mobile station (MS) 105 that may be implemented by any type of mobile station or user endpoint equipment, such as a mobile telephone device, a mobile telephone device implementing a stationary telephone, a personal digital assistant (PDA), etc. The mobile communication system 100 also includes a network element 110 that may be implemented by one or more of a base station transceiver (BTS), a base station controller (BSC), a network controller, a network cell, etc. Although only one network element 105 and one MS 110 are illustrated in FIG. 1, the mobile communication system 100 can support any number of network elements and MSs.

To implement one or more of the example communication slot structures disclosed herein, the mobile station 105 includes a processor 120, a transmit lineup 125, and a receive lineup 130. Similarly, the network element includes a processor 140, a transmit lineup 145, and a receive lineup 150. In operation, data to be transmitted from the mobile station 105 to the network element 110 passes from the processor 120 to the transmit lineup 125. As described in detail below, in some examples the transmit lineup 125 converts the data into symbols that are modulated onto one or more carriers as two or more OFDM symbols during an assigned, and/or allocated, TDMA slot, one of which is shown at reference numeral 160. As described in detail, the transmit lineup may process the symbols so that the TDMA slot 160 is divided into two or more sub-slots 165, 170 during which symbols are transmitted, wherein one OFDM symbol is transmitted per slot. The sub-slots 165, 170 may have an identical time duration, thereby evenly dividing the time of the TDMA slot 160. Alternatively, the sub-slots may have different time durations. Additionally, while two sub-slots are shown, a TDMA slot may be divided using any number of sub-slots.

In one example, the TDMA time slot used to transmit information is disjoint in time from at least one other time-division multiple access time slot carrying portions of the bits that are to be encoded. Additionally, one time slot in one frame may be used to transmit a portion of bits and a second time slot in another frame may be used to transmit another portion of bits.

The sub-slots 165, 170, each represented as an OFDM symbol, are received at the receive lineup 150 of the network element 110, which processes the symbols to obtain the bits that were sent and passes the same to the processor 140. The receive lineup 150 is configured to process information that is formatted by the transmit lineup 125. Thus, as described above, when the transmit lineup divides the TDMA slot 160 into two sub-slots 165, 170, the receive lineup 150 is configured to process the two sub-slots.

While the foregoing has described an example of communication from the mobile station 105 to the network element 110 using the transmit lineup 125 and the receive lineup 150, communication from the network element 110 to the mobile station 105 proceeds in a similar manner. Data from the processor 140 is passed to the transmit lineup 145, which communicates the data in one or more sub-slots within a TDMA slot. The sub-slots are received by the receive lineup 130 of the mobile station 105, which determines the data included in the sub-slots and passes the same to the processor 120.

Although the transmit lineup, the receive lineup, and the processor in each of the mobile station 105 and the network element 110 are shown as distinct elements in FIG. 1, such a representation is merely for the sake of clarity. For example, parts or all of the transmit lineup and the receive lineup could be implemented within the processor, which may, for example, be a digital signal processor, or any other suitable processor.

Figure 2:
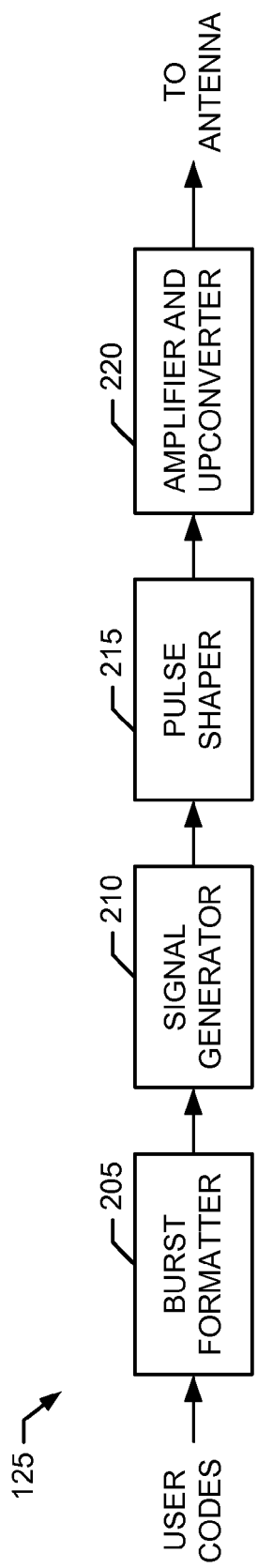
FIG. 2 illustrates an example transmit lineup that may be used by the mobile station and/or the network element of FIG. 1.

FIG. 2 shows an example transmit lineup, such as the transmit lineup 125 of FIG. 1. User codes (i.e., bits to be transmitted), which may be provided by a processor (e.g., the processor 120), are passed to a burst formatter 205, which, as described below, interleaves the user codes with training bits to form a bit sequence. The ratio of training bits or symbols to data bits or symbols need not be fixed. User code bits are payload bits after channel coding as specified for EPGRS2 in 3GPP TS 45.003: "Channel coding", which is incorporated herein by reference. Documents describing 3GPP TS 45.001 and 45.002 are also incorporated by reference herein. Alternatively, the burst formatter 205 may not process training bits, but, instead, the signal generator 210 may have prestored and/or predefined training symbols that may be used.

The bit sequence from the burst formatter 205 is passed to a signal generator 210 that maps the bits into symbols and corresponding signals for transmission as one or more OFDM symbols. A pulse shaper 215 receives the signals from the signal generator 210 and shapes the frequencies of the signals so that they comply with communication standards. The shaped pulses are then passed to an amplifier and upconverter 220, which converts the signals to radio frequency signals at the appropriate amplitudes for transmission via antenna. Thus, the signals generated by the signal generator 210 are transmitted.

As described below, the burst formatter 205 and the signal generator operate to produce signal in sub-slots, wherein each sub-slot includes data and/or training symbols and is represented by an OFDM symbol. The sub-carriers of various portions of the sub-slots may be modulated according to different modulation schemes depending on the location of the sub-carrier being modulated with respect to the frequency spectrum edges of the slot.

Figure 3:
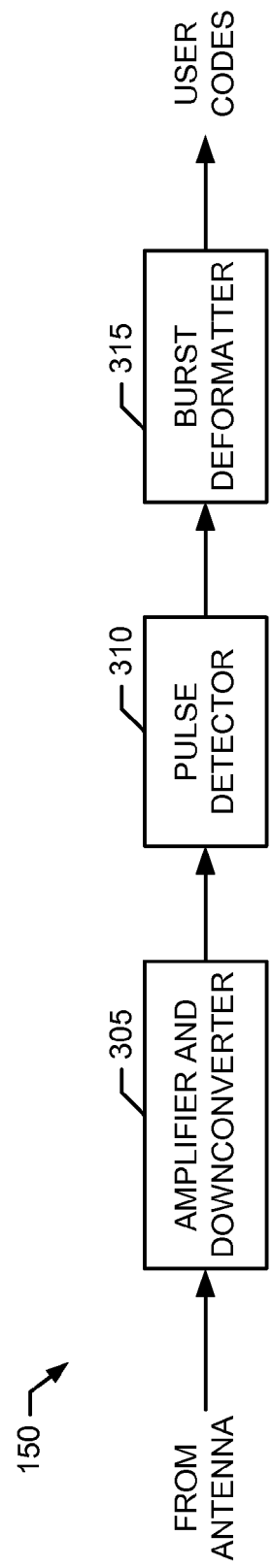
FIG. 3 illustrates an example receive lineup that may be used by the mobile station and/or the network element of FIG. 1.

FIG. 3 shows an example receive lineup, such as the receive lineup 150 of FIG. 1. In general, the receive lineup 150 performs a series of operations that are complimentary to those performed by the transmit lineup 125. In this manner, the receive lineup 150 can obtain the user codes that were processed into radio frequency signals by the transmit lineup 125. An amplifier and downconverter 305 receives signals from an antenna and converts the same to baseband frequencies. The baseband signals are passed to a pulse detector 310, which detects the symbols in the sub-slots and converts the symbols to bits. The bits are passed to a burst deformatter 315, which recovers the user codes provided to the burst formatter 205 of FIG. 2.

Figure 4:
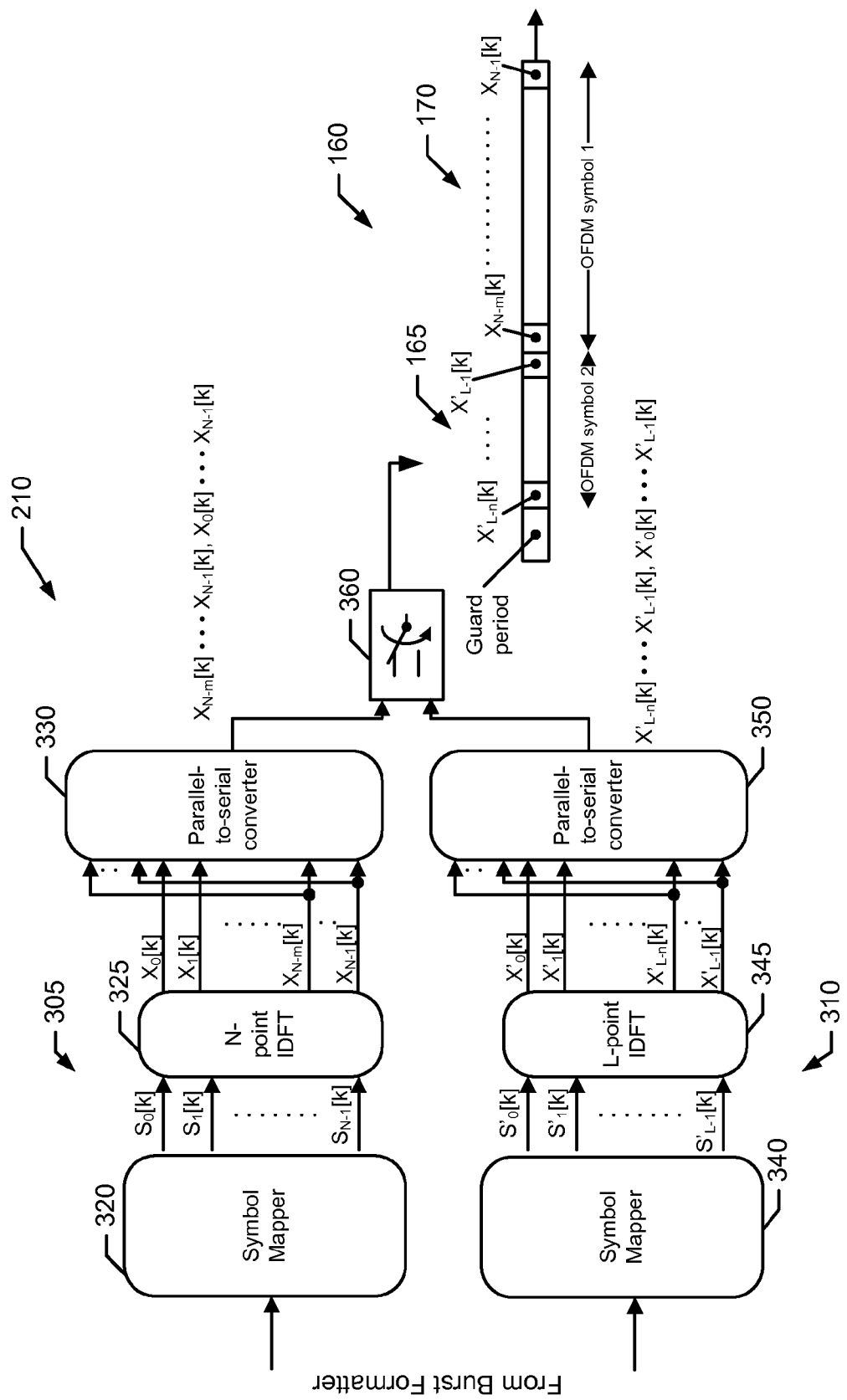
FIG. 4 illustrates an example signal generator that may be used by the transmit lineup of FIG. 2.

FIG. 4 shows additional detail of an example implementation of the signal generator 210 of FIG. 2. As described above, the signal generator 210 receives from the burst formatter 205 a series of bits, which may include data bits and training sequence bits, that are interleaved with one another. The bit series from the burst formatter 205 is received at first and second branches of the signal generator 305, 310. As described below, each of the first and second branches 305, 310 converts a selected portion of the bit series into an OFDM symbol representative of the selected portion of the bit series. For example, the first branch 305 may process the first 68 bits of the series and the second branch 310 may process the second 68 bits of the series. In such an arrangement, the first branch 305 and the second branch 310 each process one OFDM symbol representative of 68 bits. While conventionally, a single OFDM symbol occupied a single TDMA slot 160, each of the OFDM symbols occupies a sub-slot 165, 170, so that the TDMA slot 160 includes two OFDM symbols.

The first branch 305 includes a symbol mapper 320, the output of which is coupled to an N-point inverse discrete Fourier transformer (IDFT) 325. A parallel-to-serial converter 330 is coupled to the output of the N-point IDFT 325. Similarly, the second branch 310 includes a symbol mapper 340, the output of which is coupled to an L-point inverse discrete Fourier transformer (IDFT) 345. A parallel-to-serial converter 350 is coupled to the output of the N-point IDFT 345. Each of the parallel-to-serial converters 330, 350 may include a cyclic prefix adder that prepends a cyclic prefix to each OFDM body it generates. In one example, a cyclic prefix is a duplication of the last six samples from the IDFT (e.g., the N-point IDFT 325). Outputs from the parallel-to-serial converters 330, 350 are coupled to a selector 360, which alternates between selection of the output from the parallel-to-serial converter 330 and the output of parallel-to-serial converter 350.

In one operational mode of the first branch 305, the symbol mapper 320 receives, a series of bits from the burst formatter 205 and converts the series into a parallel arrangement of symbols in the frequency domain that are representative of the information (i.e., a parallel arrangement of symbols), some of which may consist of data bits and some of which may consist of training bits. The number of bits selected for mapping by the symbol mapper 320 depends on the modulation scheme used by the symbol mapper, which, as described below, may vary. In FIG. 4, this parallel arrangement is represented as $S_0[k] \ldots S_{N-1}[k]$. FIG. 5 shows an example frequency domain representation 500 of an output from the symbol mapper 320, wherein N is 68 symbols. As shown in FIG. 5, each symbol, which may represent a number of bits, is represented by modulating a sub-carrier (e.g., 505, 510, etc.) having a bandwidth of, for example, 3.8 kHz.

The parallel arrangement of frequency information representative of symbols ($S_0[k] \ldots S_{N-1}[k]$) is then processed by the N-point IDFT 325 (where N=68) to produce, for example, N time domain samples, which are represented as $X_0[k] \ldots X_{N-1}[k]$, that correspond to the frequency information representative of symbols. The time domain samples that collectively represent the 68 symbols are then provided to the parallel-to-serial converter 330, which prepends a cyclic prefix to the series. The output series from the parallel-to-serial converter 330 is represented by $X_{N-m}[k] \ldots X_{N-1}[k], X_0[k] \ldots X_{N-1}[k]$, wherein this example m is an index representative of the cyclic prefix that ranges from 1 to 6. Alternatively, the cyclic prefix may be prepended in the analog domain and need not be an integer number of samples. A time-domain representation of the output from the parallel-to-serial converter 330 is shown in FIG. 5 at reference numeral 550. As shown, the time-domain representation includes a first portion 555 that represents the time domain correspondent of the frequency domain representation 500 (i.e., a time domain signal including samples that collectively represent the 68 symbols), and also includes the cyclic prefix 560, which is a duplication of the last six samples of the first portion 555. Thus, the time domain signal 550, which is referred to as one OFDM symbol, represents 68 symbols of information 555 and includes a six sample cyclic prefix 560.

As described above, the first and second branches 305, 310 operate to convert bits into OFDM symbols. In one operational mode of the second branch 310, the symbol mapper 340 receives, a series of bits from the burst formatter 205 and converts the series into a parallel arrangement of symbols in the frequency domain that are representative of the information, some of which may be data bits and some of which may be training bits. The number of bits selected for mapping by the symbol mapper 340 depends on the modulation scheme used by the symbol mapper, which, as described below, may vary. With respect to the second branch 310, this parallel arrangement is represented as $S'_0[k] \ldots S'_{L-1}[k]$. FIG. 6 shows an example frequency domain representation 600 of an output from the symbol mapper 340, wherein L is 68 symbols. As shown in FIG. 6, each symbol is represented by modulating a sub-carrier (e.g., 605, 610, etc.) having a bandwidth of, for example, 3.8 kHz.

The parallel arrangement of frequency information representative of symbols ($S'_0[k] \ldots S'_{N-1}[k]$) is then processed by the L-point IDFT 345 (where L=68) to produce, for example, L time domain samples, which are represented as $X'_0[k] \ldots X'_{L-1}[k]$, that correspond to the frequency information representative of symbols. The time domain samples are then provided to the parallel-to-serial converter 350, which prepends a cyclic prefix to the series. The output series from the parallel-to-serial converter 330 is represented by $X'_{L-n}[k] \ldots X'_{L-1}[k], X'_0[k] \ldots X'_{L-1}[k]$, wherein n is an index representative of the cyclic prefix that ranges from 1 to 6. A time-domain representation of the output from the parallel-to-serial converter 350 is shown in FIG. 6 at reference numeral 650. As shown, the time-domain representation includes a first portion 655 that represents the time domain correspondent of the frequency domain representation 600, and also includes the cyclic prefix 660, which is a duplication of the last six samples of the first portion 655. Thus, the time domain signal 650, which is referred to as one OFDM symbol, represents 68 symbols of information 655 and includes a six sample cyclic prefix 660.

The outputs from the parallel-to-serial converters 330, 350 are provided to the selector 360, which selects an output from one of the converters 330, 350 to create a time slot 160 including two sub-slots 165, 170, each of which includes an OFDM symbol.

While the foregoing example described a situation in which communication symbols (both data and training symbols) are split evenly between two sub-slots and their corresponding OFDM symbols, other allocations of symbols to sub-slots are possible. Additionally, each sub-slot need not retain the same ratio of data symbols to training symbols within each OFDM symbol and may have cyclic prefixes of varying lengths. For example, it is possible to split symbols between sub-slots so that each sub-slot includes a radix 2 number of symbols that are represented by an OFDM symbol. One such example is shown in FIG. 7 and FIG. 8.

FIG. 7 shows a symbol allocation to a first sub-slot that includes 128 symbols (a radix 2 number of symbols), which are shown in the frequency domain representation 700. In the representation 700, each symbol is encoded on a sub-carrier having a bandwidth of 2.1 kHz. The representation 700 may be generated using the symbol mapper 320 to generate 128 symbols in the frequency domain. The frequency domain representation 700 may then be converted to a time domain signal 710 by a 128 point IDFT using the N-point IDFT 325 wherein N=128, which results in a time domain signal representing 128 symbols and including six time domain cyclic prefix samples.

As shown in FIG. 8, 8 symbols (a radix 2 number of symbols) in the frequency domain may be generated by the symbol mapper 340 of FIG. 4, such that each symbol occupies a bandwidth of 34 kHz. A representation of the symbols in the frequency domain is shown at reference numeral 800. The frequency domain representation 800 may then be converted to a time domain signal 810 by a 8 point IDFT using the L-point IDFT 345 wherein L=8, which results in a time domain signal representing 8 symbols and including six cyclic prefix samples.

As show in FIGS. 7 and 8, OFDM symbol 1 (shown at reference numeral 710), which, for example, carries all the data symbols and some training symbols, has a sub-carrier spacing of 2.1 kHz whereas OFDM symbol 2 (shown at reference numeral 810), which, for example, carries only training symbols, has a sub-carrier spacing of 34 kHz. Because the sensitivity of mobiles to loss in link performance due to high Doppler spread is known to be less sensitive with increased sub-carrier spacing, the two OFDM symbols offer different protection in particular in high speed scenarios.

Figure 9:
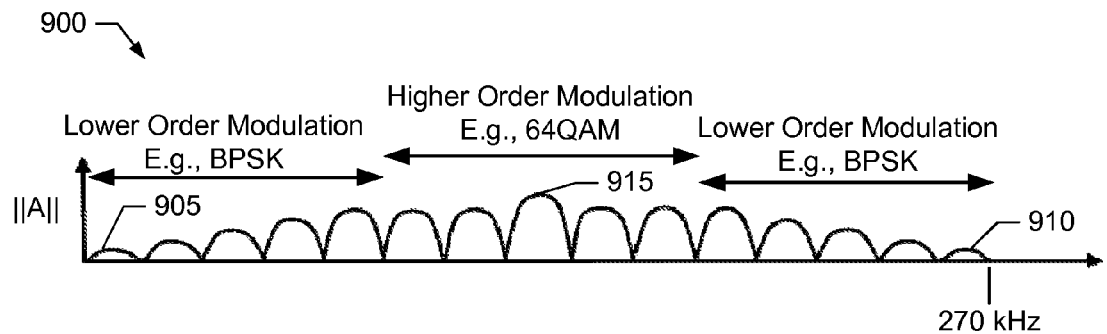
FIG. 9 illustrates an example frequency domain signal and an example allocation of modulation schemes to the sub-bands.

As described above, spectral shaping requires that sub-carriers at the edges of the transmission band have lower energy than those in the center of the band. This general characteristic shaping of the sub-carrier energies is shown in FIG. 9, wherein a first and second sub-carriers 905, 910 at the low and high ends of the transmission band have less energy than a third sub-carrier in the middle of the transmission band 915. To mitigate the impact of unequal error protection due to spectral shaping of the sub-carriers as shown in FIG. 9, the modulation order can be different across the transmission band with lower order modulation schemes applied to sub-carriers at the band edges and relatively higher order modulation schemes applied to the center of the transmission band.

Figure 10:
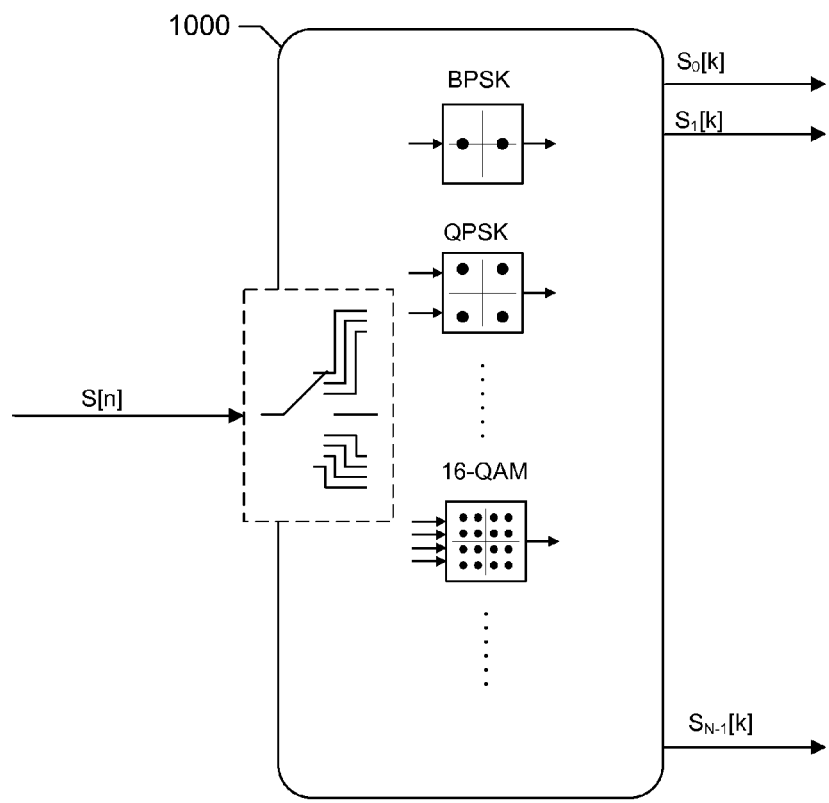
FIG. 10 illustrates an example converter/symbol mapper that may use different modulation schemes based on sub-band position within the frequency space allocated to the frame.

As shown in FIG. 10, a variable modulation symbol mapper 1000 may be used to apply different modulation orders to different sub-carriers $S_i[k]$. The variable modulation symbol mapper 1000 may be used in place of the symbol mappers 320, 340 of FIG. 4. In one example, the variable modulation symbol mapper 1000 may support all modulation schemes currently specified for EGPRS2 (e.g., binary phase shift keying (BPSK), quadrature phase shift keying (QPSK), different versions of quadrature amplitude modulation (QAM), etc.). In addition, higher order modulation schemes, like 64-QAM, could be implemented. After channel encoding according to a coding scheme, which has been selected based on overall error protection requirements due to the current channel conditions (similar to normal link adaptation in EGPRS2), the variable modulation symbol mapper 1000 divides the input data stream of bits according to the number of input bits required for a modulation selected for a specific sub-carrier. For example, if the lowest 4 sub-carriers (shown at reference numerals 905, 920, 925, 930) are to be BPSK modulated (e.g., a modulation scheme that carriers 1 bit/symbol) and the next sub-carriers are to be modulated using 16-QAM (e.g., a modulation scheme that carries 4 bits/symbol) the following mapping is performed:

| Bits | Modulation Scheme | Symbol to which the bit(s) are mapped. |
| --- | --- | --- |
| S[0] | BPSK | $S_0[k]$ |
| S[1] | BPSK | $S_1[k]$ |
| S[2] | BPSK | $S_2[k]$ |
| S[3] | BPSK | $S_3[k]$ |
| S[4], S[5], S[6], S[7] | 16-QAM | $S_4[k]$ |
| ... | ... | ... |

In one example, training symbols may be placed at transmission band edges to provide utility in channel estimation, but also to mitigate the impact of unequal error protection on data carrying symbols. This concept can be generalized to a non-uniform distribution, or interlacing, of training symbols and consequently data symbols across the transmission band in a predetermined and/or defined manner for example specified by a standard. Consequent benefits include mitigating unequal channel estimation error by providing a high density of transmission symbols in areas with low sub-carrier power spectral density and mitigating the impact of unequal error protection on data by having a low density of data carrying symbols.

In cases in which higher order modulation results in spare sub-carriers, these sub-carriers can remain unoccupied, carry padding bits, or carry symbols undefined to the receiver. In the case in which sub-carriers remain unoccupied, interference on neighbor cells is reduced. Alternatively, when the spare sub-carriers are used to carry padding bits, these sub-carriers can for example, can carry a predefined sequence of bits or set to the all zero sequence. When the spare sub-carriers carry symbols undefined to the receiver, these sub-carriers can for example be used to reduce peak-to-average power ratio (PAPR) at the transmitter.

As an example, a symbol mapping technique includes, for OFDM symbol 1, processing 1800 interleaved bits d[0] . . . d[1799] in four sets (B=0, 1, 2, 3, 4): d[0] . . . d[449], d[450] . . . d[899], d[900] . . . d[1349], and d[1350] . . . d[1799]. e(B,j)={d(128B+j), d(128B+j+1), d(128B+j+2)} for j=1, . . . , 4 e(B,j)={d(128B+j), d(128B+j+1), d(128B+j+2), d(128B+j+3)} for j=6, . . . , 12 e(B,j)={d(128B+j), d(128B+j+1), d(128B+j+2), d(128B+j+3)} for j=14, . . . , 20 e(B,j)={d(128B+j), d(128B+j+1), d(128B+j+2), d(128B+j+3)} for j=22, . . . , 30 e(B,j)={d(128B+j), d(128B+j+1), d(128B+j+2), d(128B+j+3)} for j=32, . . . , 38 e(B,j)={d(128B+j), d(128B+j+1), d(128B+j+2), d(128B+j+3)} for j=40, . . . , 46 e(B,j)={d(128B+j), d(128B+j+1), d(128B+j+2), d(128B+j+3), d(128B+j+4)} for j=48, . . . , 52 e(B,j)={d(128B+j), d(128B+j+1), d(128B+j+2), d(128B+j+3), d(128B+j+4)} for j=54, . . . , 59 e(B,j)={d(128B+j), d(128B+j+1), d(128B+j+2), d(128B+j+3), d(128B+j+4)} for j=61, . . . , 66 e(B,j)={d(128B+j), d(128B+j+1), d(128B+j+2), d(128B+j+3), d(128B+j+4)} for j=68, . . . , 73 e(B,j)={d(128B+j), d(128B+j+1), d(128B+j+2), d(128B+j+3), d(128B+j+4)} for j=75, . . . , 79 e(B,j)={d(128B+j), d(128B+j+1), d(128B+j+2), d(128B+j+3)} for j=81, . . . , 87 e(B,j)={d(128B+j), d(128B+j+1), d(128B+j+2), d(128B+j+3)} for j=89, . . . , 95 e(B,j)={d(128B+j), d(128B+j+1), d(128B+j+2), d(128B+j+3)} for j=97, . . . , 105 e(B,j)={d(128B+j), d(128B+j+1), d(128B+j+2), d(128B+j+3)} for j=107, . . . , 113 e(B,j)={d(128B+j), d(128B+j+1), d(128B+j+2), d(128B+j+3)} for j=115, . . . , 121 e(B,j)={d(128B+j), d(128B+j+1), d(128B+j+2)} for j=123, . . . , 126

These subsets are mapped onto constellation points as specified in 3GPP TS 45.004.

Training sequence symbols are interlaced in the remaining positions according to the following rule:

For B=0, 1, 2, 3, let
e(B,0)=TS__8PSK(0)
e(B,5)=TS__8PSK(1)
e(B,13)=TS__16QAM(2)
e(B,21)=TS__16QAM(3)
e(B,31)=TS__16QAM(4)
e(B,39)=TS__16QAM(5)
e(B,47)=TS__16QAM(6)
e(B,53)=TS__32QAM(7)
e(B,60)=TS__32QAM(8)
e(B,67)=TS__32QAM(9)
e(B,74)=TS__32QAM(10)
e(B,80)=TS__16QAM(11)
e(B,88)=TS__16QAM(12)
e(B,96)=TS__16QAM(13)
e(B,106)=TS__16QAM(14)
e(B,114)=TS__16QAM(15)
e(B,122)=TS__8PSK(16)
e(B,127)=TS__8PSK(17)

Where TS__8PSK(i) denotes a training sequence symbol specified for 8PSK with bit numbers {BN(183+3i), BN(184+3i), BN(185+3i)}, TS__16 QAM(i) denotes a training sequence symbol specified for 16 QAM with bit numbers {BN(244+3i), BN(245+3i), BN(246+3i)}, and TS__32 QAM(i) denotes a training sequence symbol specified for 32 QAM with bit numbers {BN(305+3i), BN(306+3i), BN(307+3i)} (see 3GPP TS 45.002).

This results in a vector of sub-carriers for OFDM symbol 1.

For OFDM Symbol 2, the last 8 symbols of the training sequence symbols for 16 QAM (see 3GPP TS 45.002) are mapped onto constellation points as specified in 3GPP TS 45.002.

Figure 11:
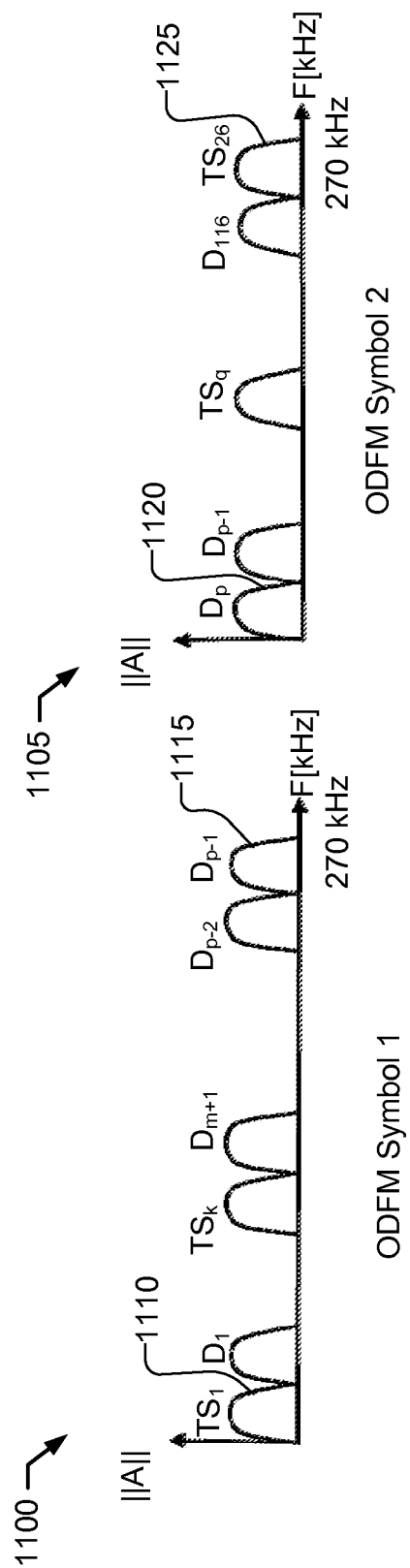
FIG. 11 illustrates example frequency domain signals produced by the signal generator of FIG. 4, showing an allocation of training and data symbols in two sub-bands.

As noted previously, training symbols and data symbols may be distributed, or interlaced, throughout the OFDM symbols in any desired manner. However, in certain examples, it may be beneficial to distribute the training symbols in particular manners. For example, with reference to FIG. 11, two OFDM symbols 1100, 1105 are shown in the frequency domain. As shown in FIG. 11, the first OFDM symbol 1100 includes a training symbol 1110 at the lowest frequency of the transmission band, but includes a data symbol 1115 at the highest frequency of the transmission band. By contrast, the second OFDM symbol 1105 includes a data symbol 1120 at the lowest frequency of the transmission band and a training symbol 1125 at the highest frequency of the transmission band. Specifying that, for a pair of OFDM symbols that constitute a slot, one of the OFDM symbols includes a low frequency training symbol (e.g., the training symbol 1110) and that the other OFDM symbol includes a high frequency training symbol (e.g., the training symbol 1125) simplifies techniques and yields better channel estimation accuracy. Such an allocation of training symbols allows an interpolation approach to be used in channel estimation for all data carrying sub-carriers as it is then guaranteed data symbols will either occupy the same sub-carrier as a training symbol (in another OFDM symbol), or occupy a sub-carrier that is surrounded in frequency by sub-carriers containing training symbols. For example, as shown in FIG. 11, the data sub-carriers $D_1$ . . . $D_{p-2}$, $D_{p+1}$ . . . $D_{116}$ are surrounded in frequency at least by the training symbols $TS_1$ . . . $TS_{26}$ and, therefore, channel estimation can proceed by interpolating at least in frequency between the relevant training symbols. Additionally, data sub-carriers $D_{p-1}$ and $D_p$ occupy the same sub-carriers as $TS_1$ and $TS_{26}$, the channel estimates of which can be estimated using these two training symbols only. The placement of data symbols and training symbols within the frequency spectrum may be fixed and standardized.

The selection of modulation order for sub-carriers as well as placement of training symbols inside the data stream may be performed in a predetermined manner. However, it would be possible to perform dynamic adaptation of sub-carrier modulation with the presence of a fast feedback channel.

Flowcharts representative of example processes that may be carried out by the mobile station 105 or the network element 110 are shown in FIGS. 12-15. In these examples, the process represented by each flowchart may be implemented by one or more programs comprising machine readable instructions for execution by: (a) a processor, such as the processor 1612 shown in the example processing system 1600 discussed below in connection with FIG. 16, (b) a controller, and/or (c) any other suitable device, such as a digital signal processor (DSP). The one or more programs may be embodied in software stored on a tangible medium such as, for example, a flash memory, a CD-ROM, a floppy disk, a hard drive, a DVD, or a memory associated with the processor 1612, but the entire program or programs and/or portions thereof could alternatively be executed by a device other than the processor 1612 and/or embodied in firmware or dedicated hardware (e.g., implemented by an application specific integrated circuit (ASIC), a programmable logic device (PLD), a field programmable logic device (FPLD), discrete logic, etc.).

For example, any or all of the transmit lineup 125 and the receive lineup 150, or, for that matter, any of the functions shown in FIG. 1, could be implemented by any combination of software, hardware, and/or firmware. Also, some or all of the processes represented by the flowcharts of FIGS. 12-15 may be implemented manually. Further, although the example processes are described with reference to the flowcharts illustrated in FIGS. 12-15, many other techniques for implementing the example methods and apparatus described herein may alternatively be used. For example, with reference to the flowcharts illustrated in FIGS. 12-15, the order of execution of the blocks may be changed, and/or some of the blocks described may be changed, eliminated, combined and/or subdivided into multiple blocks.

Figure 12:
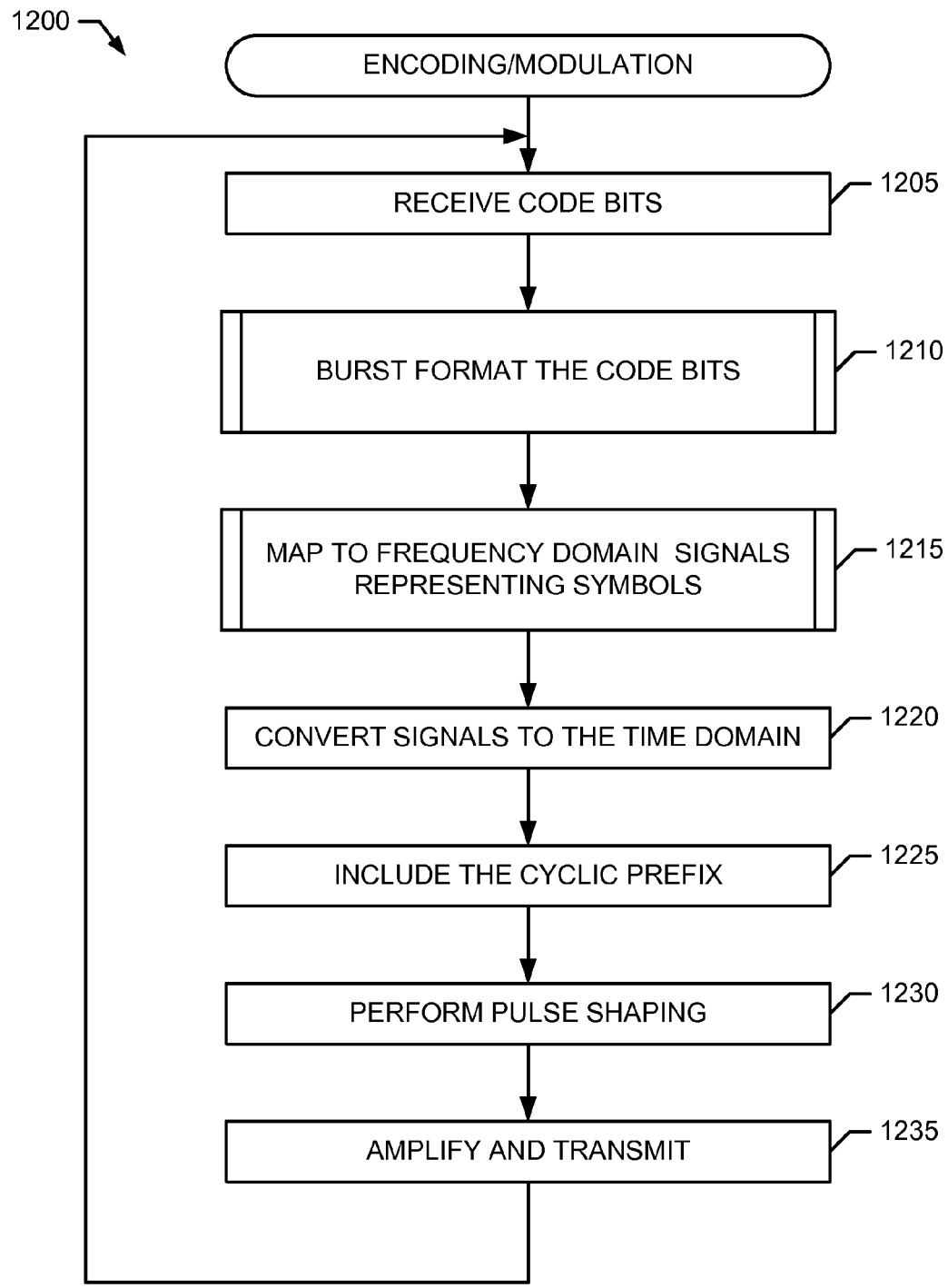
FIG. 12 is a flow diagram representing an example encoding/modulation process.

An example process 1200 that may be executed to implement the transmit lineup 125 of FIG. 2 is illustrated in FIG. 12. The process 1200 may be performed by, or used to implement, the burst formatter 205, the signal generator 210, the pulse shaper 215, and the amplifier and converter 220 of FIG. 2. With reference to the example transmit lineup 125 of FIG. 3, the process 1200 the burst formatter 205 receives code bits that are to be encoded and transmitted (block 1205). The bits may be, for example, user codes indicative of audio, video, data, or any other suitable information and/or data. The burst formatter 1210, formats the code bits, which, as explained in conjunction with FIG. 13, may include interleaving data or code bits with training bits and allocating symbols between sub-slots (block 1210).

After the code bits have been formatted, the signal generator 210, which may be implemented as shown in the example of FIG. 4, maps the bits to frequency domain signals representing symbols (block 1215). Further detail regarding the mapping is provided in conjunction with FIG. 14. The mapping may be carried out in a manner such that two or more sub-slots may be used each to carry a portion of the symbols (i.e., that two OFDM symbols may be carried per TDMA slot). Additionally, the mapping may be carried out using one or more modulation schemes and, therefore, the number of bits per symbol may vary across a transmission band of frequencies.

After the frequency domain signals have been mapped (block 1215), the signal generator 210 converts the frequency domain signals to the time domain (block 1220). While the generation of the frequency domain signals and their conversion to the time domain are shown separately, the signal generator may, in fact, map the burst formatted bits directly to a time domain signal all in one process, thereby eliminating the express processing of converting the frequency domain signals to the time domain.

The signal generator 210 then prepends a cyclic prefix to the time domain signal (block 1225). The cyclic prefix may be, for example, a repetition of a number of the last number of samples of the time domain signal (e.g., six samples). Alternatively, the cyclic prefix may be carried out in any other manner. At this point in the process, the time domain signal including the cyclic prefix may be referred to as an OFDM symbol.

After the time domain signal is generated at the signal generator 210, the pulse shaper 215 shapes the time domain waveform to ensure that it complies with the transmission bandwidth requirements and constraints (block 1230). While the pulse shaping is shown as separate from the signal generation, this is not necessarily the case, as the pulse shaping may be carried out during the mapping of bits to symbols, or at any other suitable point in the transmission lineup 125.

The amplifier and upconverter 220 then modulates a carrier wave to communicate the time domain signal (block 1235). The modulation of the carrier wave may be performed in any manner that transfers the time domain signals (i.e., the OFDM symbols) to a receiver.

Figure 13:
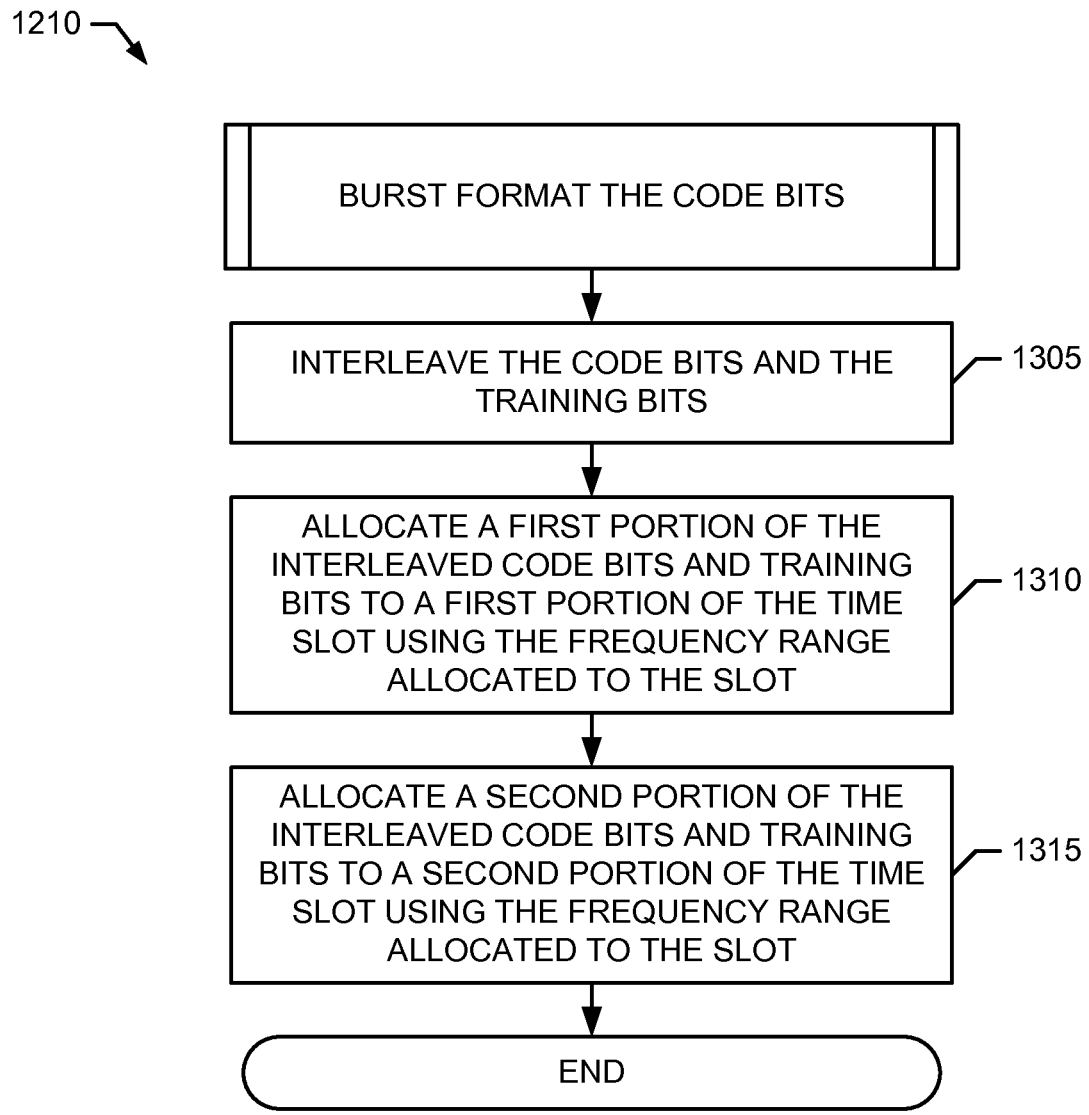
FIG. 13 is a flow diagram representing an example process of burst formatting code bits.

An example process 1210 that may be executed to burst format the code bits is illustrated in FIG. 13. The process 1210 may be performed by, or used to implement, the burst formatter 205 of FIG. 2. The burst formatter 205 receives the code bits and interleaves the code bits with training bits (block 1305). In this manner, the training bits are distributed throughout the code bits in a predetermined manner so that the frequencies used to represent the code bits will be bordered in frequency with the training bits or share frequencies with the training bits. Of course, the mixing of the code and training information may be carried out at the symbol level, in which case code symbols will be interleaved in frequency with the training symbols.

The burst formatter 205 also allocates certain ones of the code and training bits to reside in a portion of a TDMA time slot (block 1310). For example, the burst formatter 205 may allocate a first half of the training and code bits to a full transmit bandwidth spectrum that, in time, corresponds only to a first half of a TDMA slot (e.g., the sub-slot 165).

The burst formatter 205 then allocated certain other ones of the code and training bits to reside in a different portion of the TDMA time slot than the first portion (block 1315). For example, the burst formatter 205 may allocate a second half of the training and code bits to a full transmission bandwidth spectrum that, in time corresponds only to a second half of the TDMA slot (e.g., the sub-slot 170).

Figure 14:
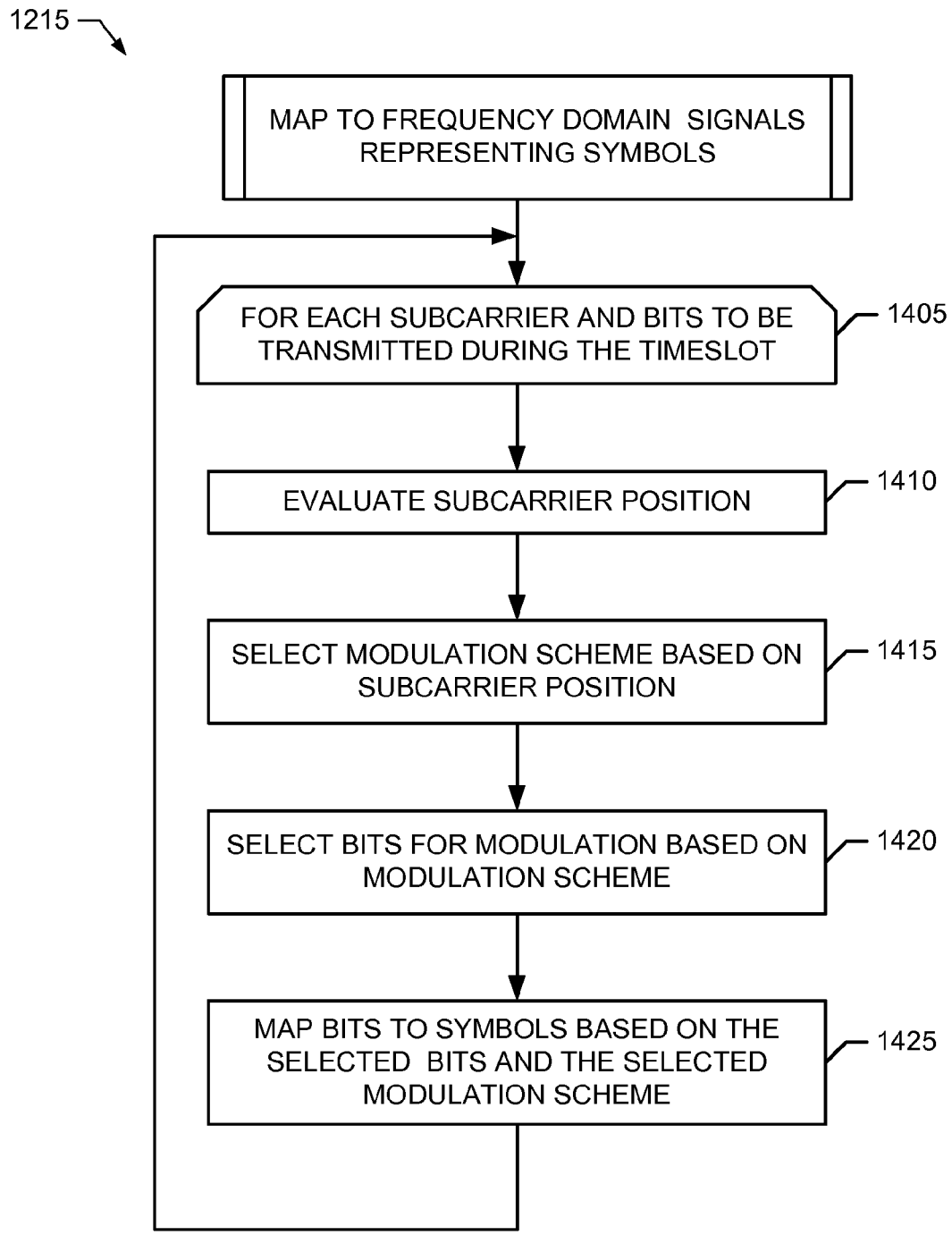
FIG. 14 is a flow diagram representing an example process of mapping frequency domain signals representing symbols.

An example process 1215 that may be executed to map bits to frequency domain signals representing symbols is illustrated in FIG. 14. The process 1215 may be performed by, or used to implement, the burst formatter signal generator 210, which may be implemented as shown in FIG. 4. The signal generator 210 receives the burst-formatted bits and performs the following processing for each sub-carrier (block 1405). The signal generator 210 evaluates the sub-carrier position within the transmission bandwidth (block 1410) and selects a modulation scheme based on the position of the sub-carrier (block 1415). For example, as described above, a low bit rate modulation scheme (e.g., BPSK, etc.) may be selected for sub-carriers at or near the edges of the transmission band where signal energy is attenuated. By contrast, a high bit rate modulation scheme (e.g., 64-QAM, etc.) may be selected for sub-carriers not near the edge of the transmission band.

After the modulation scheme is selected (block 1415), the bits for modulation are selected (block 1420). As noted above, different modulation schemes accommodate a different number of bits per symbol. Thus, a variable number of bits may be represented by a symbol, based on the modulation scheme used by the sub-carrier for that symbol. Thus, for a 16-QAM modulation scheme, 4 bits are selected, whereas for a BPSK modulation scheme, 2 bits are selected.

After the bits and the modulation scheme are selected, the bits are mapped to symbols based on the selected modulation scheme (block 1425). As noted previously, different numbers of symbols may be included in different OFDM symbols.

Thus, not all available sub-carriers need to be used when mapping bits to symbols and multiple sub-slots may be used as described above.

Figure 15:
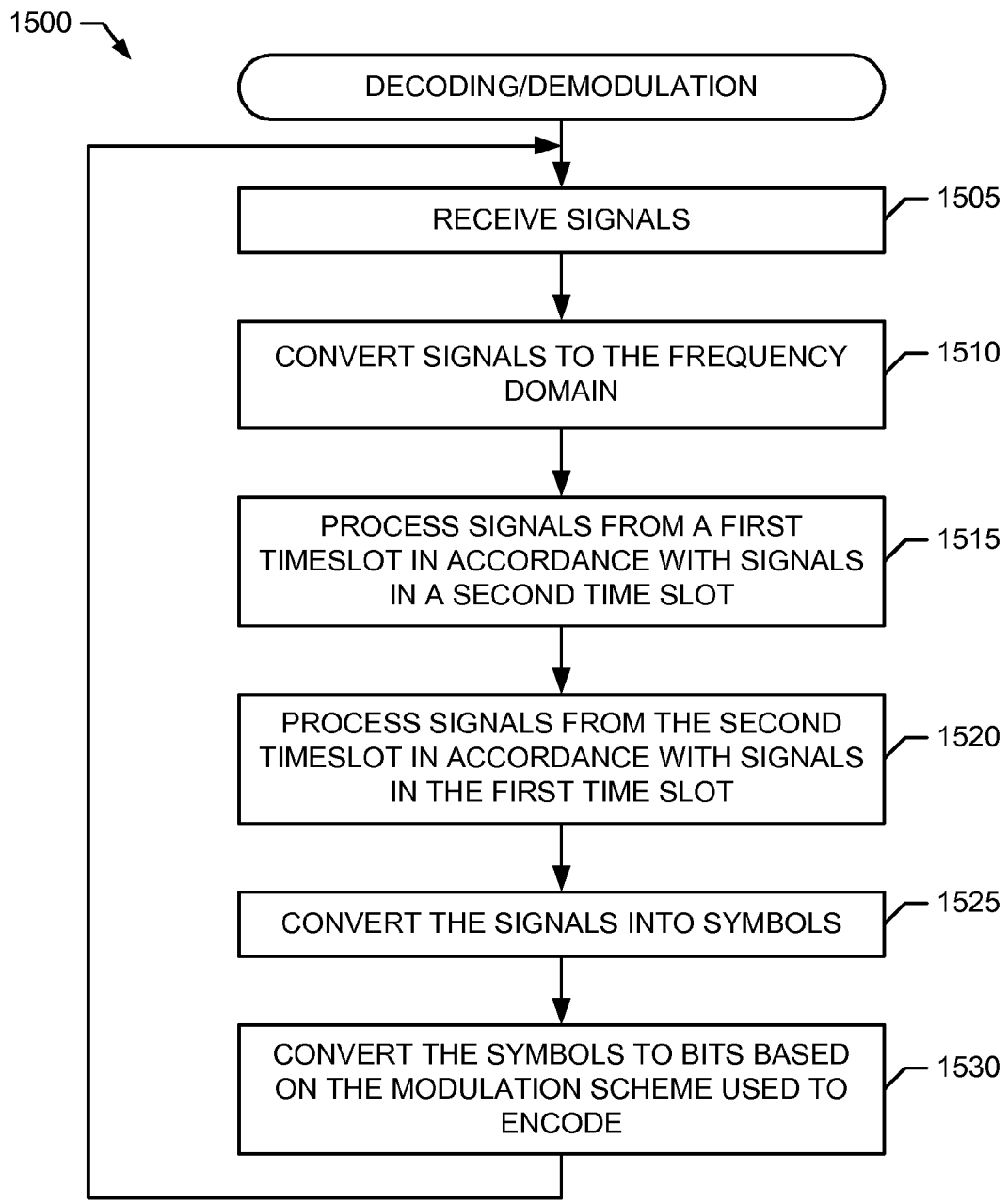
FIG. 15 is a flow diagram representing an example decoding/demodulation process.

An example process 1500 that may be executed to perform decoding and demodulation is illustrated in FIG. 15. The process 1500 may be performed by, or used to implement, the receive lineup 150 of FIGS. 1 and 2. With reference to FIG. 2, the amplifier and downconverter 305 receives signals from the antenna and converts the same to baseband for further processing (block 1505). The pulse detector 310 then converts the received signals to the frequency domain (block 1510).

The frequency domain signals are then decoded to determine the symbols they represent and, advantageously, this decoding may take place across sub-slots, wherein information from a first sub-slot may be used during the decoding of the information in a second sub-slot (blocks 1515, 1520). For example, training symbols in a first sub-slot may be used to decode data symbols in the second sub-slot. Such an arrangement facilitates channel estimation to assist in proper decoding of the symbols.

After the signals from the timeslots are processed, the signals are converted into symbols (block 1525). The symbols are further converted into bits (block 1530).

Figure 16:
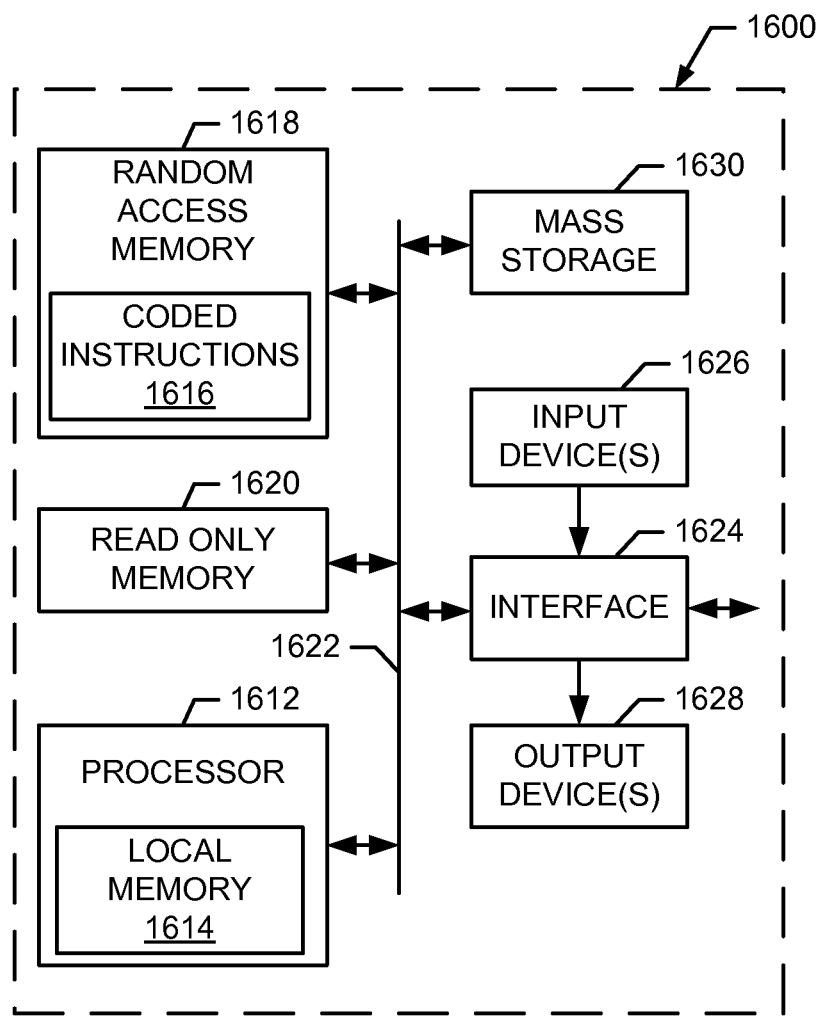
FIG. 16 is block diagram of an example processing system that may execute example machine readable instructions used to implement some or all of the above processes.

FIG. 16 is a block diagram of an example processing system 1600 capable of implementing the apparatus and methods disclosed herein. The processing system 1600 can be, for example, a mobile station processing platform, a network element processing platform, a server, a personal computer, a personal digital assistant (PDA), an Internet appliance, a mobile phone, or any other type of computing device.

The system 1600 of the instant example includes a processor 1612 such as a general purpose programmable processor. The processor 1612 includes a local memory 1614, and executes coded instructions 1616 present in the local memory 1614 and/or in another memory device. The processor 1612 may execute, among other things, machine readable instructions to implement the processes represented in FIGS. 3-6. The processor 1612 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors, one or more microcontrollers from the ARM® family of microcontrollers, the PIC® family of microcontrollers, etc. Of course, other processors from other families are also appropriate.

The processor 1612 is in communication with a main memory including a volatile memory 1618 and a non-volatile memory 1620 via a bus 1622. The volatile memory 1618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1620 may be implemented by flash memory and/or any other desired type of memory device. Access to the main memory 1618, 1620 is typically controlled by a memory controller (not shown).

The processing system 1600 also includes an interface circuit 1624. The interface circuit 1624 may be implemented by any type of interface standard, such as an Ethernet interface, a universal serial bus (USB), and/or a third generation input/output (3GIO) interface.

One or more input devices 1626 are connected to the interface circuit 1624. The input device(s) 1626 permit a user to enter data and commands into the processor 1612. The input device(s) can be implemented by, for example, a keyboard, a mouse, a touchscreen, a track-pad, a trackball, an isopoint and/or a voice recognition system.

One or more output devices 1628 are also connected to the interface circuit 1624. The output devices 1628 can be implemented, for example, by display devices (e.g., a liquid crystal display, a cathode ray tube display (CRT)), by a printer and/or by speakers. The interface circuit 1624, thus, typically includes a graphics driver card.

The interface circuit 1624 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1600 also includes one or more mass storage devices 1630 for storing software and data. Examples of such mass storage devices 1630 include floppy disk drives, hard drive disks, compact disk drives and digital versatile disk (DVD) drives.

As an alternative to implementing the methods and/or apparatus described herein in a system such as the processing system of FIG. 16, the methods and or apparatus described herein may be embedded in a structure such as a processor and/or an ASIC (application specific integrated circuit).

What is claimed is:

1. A method comprising:
converting a first portion of a set of bits that are to be encoded to a first orthogonal frequency-division multiplexing symbol to be transmitted during a first portion of a time-division multiple access time slot; and
converting a second portion of the set of bits that are to be encoded to a second orthogonal frequency-division multiplexing symbol to be transmitted during a second portion of the time-division multiple access time slot, wherein converting the first portion of the set of bits to the first orthogonal frequency-division multiplexing symbol comprises mapping the first portion of the set of bits to one or more symbols represented by one or more modulated sub-carriers, wherein the one or more sub-carriers are modulated according to different modulation schemes.

2. The method of claim 1, wherein the time-division multiple access time slot is disjoint in time from at least one other time-division multiple access time slot carrying portions of the bits that are to be encoded.

3. The method of claim 1, wherein a modulation scheme of a first order is used in modulating one or more sub-carriers near an edge of a transmission band and a modulation scheme of a second order higher than the first order is used to modulate one or more sub-carriers near a middle of the transmission band.

4. The method of claim 1, wherein one or more training symbols are modulated onto one or more sub-carriers.

5. The method of claim 4, wherein at least one training symbol is modulated onto a low frequency sub-carrier of one of the first orthogonal frequency-division multiplexing symbol or the second orthogonal frequency-division multiplexing symbol.

6. The method of claim 5, wherein at least one training symbol is modulated onto a high frequency sub-carrier of one of the first orthogonal frequency-division multiplexing symbol or the second orthogonal frequency-division multiplexing symbol.

7. The method of claim 4, wherein at least one training symbol is modulated onto a low frequency sub-carrier of the first orthogonal frequency-division multiplexing symbol and at least one training symbols is modulated onto a high frequency sub-carrier of the second orthogonal frequency-division multiplexing symbol.

8. The method of claim 1, wherein converting the first portion of the set of bits to the first orthogonal frequency-division multiplexing symbol comprises mapping the first portion of the set of bits to a radix 2 number of symbols.

9. The method of claim 8, wherein converting the second portion of the set of bits to the second orthogonal frequency-division multiplexing symbol comprises mapping the second portion of the set of bits to a radix 2 number of symbols.

10. The method of claim 8, wherein the bits comprise information bits and training bits.

11. The method of claim 1, wherein the first orthogonal frequency-division multiplexing symbol includes a first number of training symbols and wherein the second orthogonal frequency-division multiplexing symbol includes a second number of training symbols different from the first number of training symbols.

12. A method comprising:
converting a portion of a set of bits that are to be encoded to an orthogonal frequency-division multiplexing symbol to be transmitted during at least one time-division multiple access time slot, wherein the converting comprises mapping the portion of the set of bits to one or more symbols represented by one or more modulated sub-carriers, and wherein a modulation scheme of a first order is used to modulate sub-carriers near an edge of a transmission band and a modulation scheme of a second order higher than the first order is used to modulate sub-carriers near a middle of the transmission band.

13. The method of claim 12, wherein one or more training symbols are modulated onto one or more sub-carriers.

14. The method of claim 13, wherein at least one training symbol is modulated onto a low frequency sub-carrier of the orthogonal frequency-division multiplexing symbol.

15. The method of claim 13, wherein at least one training symbol is modulated onto a high frequency sub-carrier of the orthogonal frequency-division multiplexing symbol.

16. The method of claim 12, wherein converting the portion of the set of bits to the orthogonal frequency-division multiplexing symbol comprises mapping the portion of the set of bits to a radix 2 number of symbols.

17. The method of claim 12, wherein the bits comprise information bits and training bits.

18. An apparatus, comprising:
a processor; and
a memory comprising machine readable instructions which, when executed, cause the processor to:
convert a first portion of a set of bits that are to be encoded to a first orthogonal frequency-division multiplexing symbol to be transmitted during a first portion of a time-division multiple access time slot; and
convert a second portion of the set of bits that are to be encoded to a second orthogonal frequency-division multiplexing symbol to be transmitted during a second portion of the time-division multiple access time slot, wherein converting the first portion of the set of bits to the first orthogonal frequency-division multiplexing symbol comprises mapping the first portion of the set of bits to one or more symbols represented by one or more modulated sub-carriers, wherein the one or more sub-carriers are modulated according to different modulation schemes.

19. The apparatus of claim 18, wherein the instructions cause the processor to use a modulation scheme of a first order in modulating one or more sub-carriers near an edge of a transmission band and use a modulation scheme of a second order higher than the first order to modulate one or more sub-carriers near a middle of the transmission band.

20. The apparatus of claim 19, wherein the amplitude of sub-carriers are attenuated to comply with spectral emission requirements.

21. The apparatus of claim 20, wherein the spectral emission requirements are the requirements related to transmitting an EGPRS burst.

22. The apparatus of claim 18, wherein the apparatus is a mobile station.

23. The apparatus of claim 18, wherein the apparatus is a mobile communication network element.

24. An apparatus, comprising:
a processor; and
a memory comprising machine readable instructions which, when executed, cause the processor to:
convert a portion of a set of bits that are to be encoded to an orthogonal frequency-division multiplexing symbol to be transmitted during at least one time-division multiple access time slot, wherein the converting comprises mapping the portion of the set of bits to one or more symbols represented by one or more modulated sub-carriers, and wherein a modulation scheme of a first order is used to modulate sub-carriers near an edge of a transmission band and a modulation scheme of a second order higher than the first order is used to modulate sub-carriers near a middle of the transmission band.

25. The apparatus of claim 24, wherein the apparatus is a mobile station.

26. The apparatus of claim 25, wherein the apparatus is a mobile communication network element.

27. The method of claim 2, wherein the bits that are to be encoded are one codeword.

28. The method of claim 3, wherein the amplitude of sub-carriers are attenuated to comply with spectral emission requirements.

29. The method of claim 28, wherein the spectral emission requirements are the requirements related to transmitting an EGPRS burst.

* * * * *